(12) United States Patent
Seanard

(10) Patent No.: US 11,688,545 B2
(45) Date of Patent: Jun. 27, 2023

(54) REMOVABLE WEIGHTED VEHICLE SAFETY GUARD SYSTEM

(71) Applicant: Jordan Seanard, Newark, IL (US)

(72) Inventor: Jordan Seanard, Newark, IL (US)

( * ) Notice: Subject to any disclaimer, the term of this patent is extended or adjusted under 35 U.S.C. 154(b) by 359 days.

(21) Appl. No.: 16/935,544

(22) Filed: Jul. 22, 2020

(65) Prior Publication Data

US 2021/0039723 A1 Feb. 11, 2021

Related U.S. Application Data

(60) Provisional application No. 62/877,687, filed on Jul. 23, 2019.

(51) Int. Cl.
| | |
|---|---|
| *H01F 27/28* | (2006.01) |
| *H01F 27/02* | (2006.01) |
| *H01F 27/26* | (2006.01) |
| *H01F 27/29* | (2006.01) |
| *H01F 27/32* | (2006.01) |
| *H01F 41/06* | (2016.01) |
| *B60R 19/12* | (2006.01) |
| *B60R 19/24* | (2006.01) |
| *B62D 37/00* | (2006.01) |
| *B60D 1/52* | (2006.01) |

(52) U.S. Cl.
CPC ......... *H01F 27/2885* (2013.01); *B60R 19/12* (2013.01); *B60R 19/24* (2013.01); *B62D 37/00* (2013.01); *H01F 27/02* (2013.01); *H01F 27/26* (2013.01); *H01F 27/29* (2013.01); *H01F 27/325* (2013.01); *H01F 41/06* (2013.01); *B60D 1/52* (2013.01)

(58) Field of Classification Search
CPC ......... B60R 19/12; B60R 19/24; B62D 37/00; B62D 37/04; B60D 1/52
See application file for complete search history.

(56) References Cited

U.S. PATENT DOCUMENTS

| | | | | |
|---|---|---|---|---|
| 1,565,592 | A | * 12/1925 | Sauer | B60R 19/24 |
| | | | | 293/140 |
| 1,704,768 | A | * 3/1929 | Sigman | B60R 21/34 |
| | | | | 293/120 |

(Continued)

FOREIGN PATENT DOCUMENTS

CA 2299042 A1 * 8/2001 ............... B60D 1/52

*Primary Examiner* — Karen Beck
*Assistant Examiner* — Scott F. Underwood
(74) *Attorney, Agent, or Firm* — Brennan, Manna & Diamond, LLC

(57) ABSTRACT

A removable weighted vehicle safety guard system having a safety attachment that removably attaches to the back end of a vehicle to add weight, thereby helping to keep the back end of the vehicle stabilized while driving in inclement weather or on slippery road surfaces, and additionally forms a brush guard to prevent damage to the vehicle should another vehicle rear-end the user's vehicle. The removable weighted vehicle safety guard system attaches to the back end of the vehicle via the hitch and is secured using bolts or trailer pins. The removable weighted vehicle safety guard system provides static weight to the back end of the vehicle but may optionally also receive additional if needed. The additional weight may take a number of forms, including weight blocks, and can be added to the removable weighted vehicle safety guard system via bolts or trailer pins.

9 Claims, 3 Drawing Sheets

(56) References Cited

U.S. PATENT DOCUMENTS

| | | | | |
|---|---|---|---|---|
| D269,423 S | * | 6/1983 | Waite | D12/169 |
| D375,066 S | * | 10/1996 | Tisi | D12/169 |
| 5,829,774 A | * | 11/1998 | Klemp | B60D 1/52 |
| | | | | 280/507 |
| 7,261,346 B1 | * | 8/2007 | Kubesh | B60R 19/52 |
| | | | | 293/115 |
| D673,084 S | * | 12/2012 | Wu | D12/162 |
| 10,994,683 B2 | * | 5/2021 | Krutzfeldt | B60R 19/46 |
| 2002/0171225 A1 | * | 11/2002 | Adair | B60D 1/54 |
| | | | | 280/491.5 |
| 2003/0184100 A1 | * | 10/2003 | Turner | B60R 19/12 |
| | | | | 293/155 |
| 2004/0104558 A1 | * | 6/2004 | Williams | B60D 1/06 |
| | | | | 280/491.5 |
| 2005/0046226 A1 | * | 3/2005 | White | B60R 19/18 |
| | | | | 296/102 |
| 2005/0116498 A1 | * | 6/2005 | Kobayashi | B60R 19/24 |
| | | | | 296/155 |
| 2006/0261612 A1 | * | 11/2006 | Pratka | B60R 19/52 |
| | | | | 293/115 |
| 2012/0187704 A1 | * | 7/2012 | Gibbs | B60R 19/46 |
| | | | | 293/142 |
| 2012/0248801 A1 | * | 10/2012 | Wu | B60D 1/60 |
| | | | | 293/142 |
| 2013/0187395 A1 | * | 7/2013 | Hanson | B60R 19/52 |
| | | | | 293/115 |
| 2015/0158444 A1 | * | 6/2015 | Wu | B60D 1/60 |
| | | | | 293/142 |
| 2017/0028951 A1 | * | 2/2017 | Shin | B60R 19/44 |

* cited by examiner

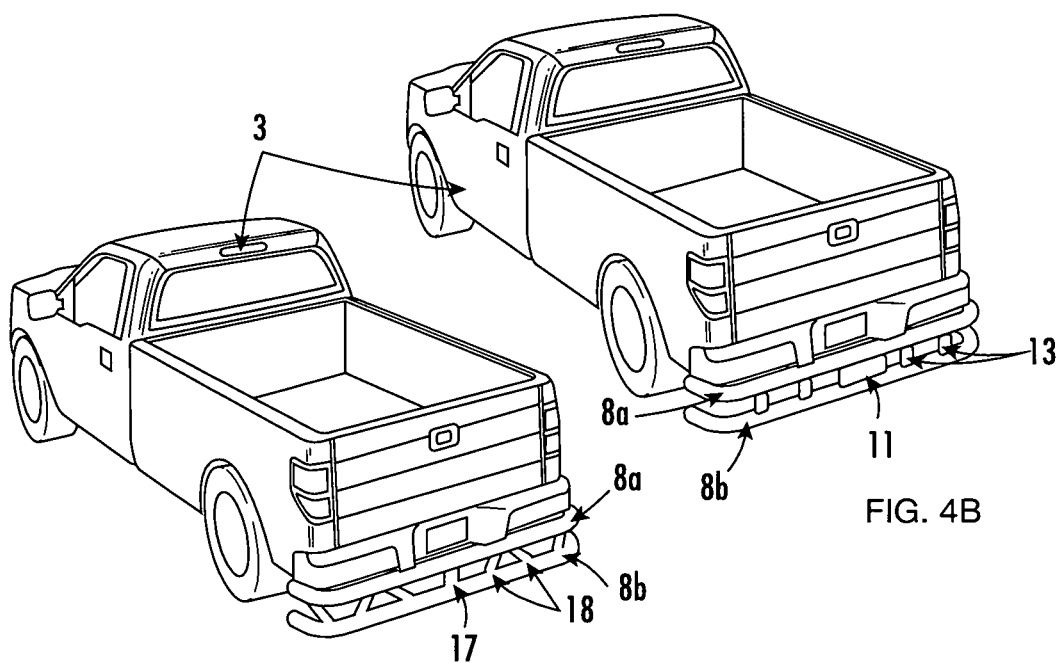
FIG. 4A
FIG. 4B
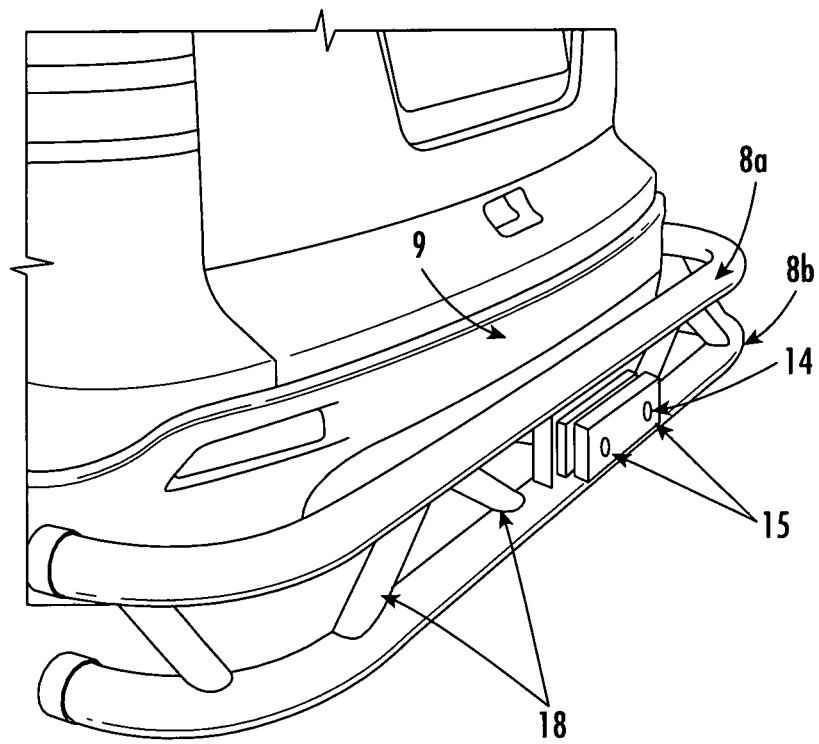
FIG. 5

REMOVABLE WEIGHTED VEHICLE SAFETY GUARD SYSTEM

CROSS-REFERENCE TO RELATED APPLICATION

The present application is related to and claims priority from prior provisional application Ser. No. 62/877,687, filed Jul. 23, 2019, the entire application of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of automotive safety devices. More specifically, the invention is a removable weighted vehicle safety guard system to weigh down the back of the vehicle when driving during inclement weather.

2. Description of the Related Art

Driving an automobile has inherent risks, particularly during inclement weather. The back end of a vehicle can slide out of control on slippery road surfaces caused by rain, snow, or ice. Sliding, hydroplaning, and spinning out on a slippery road surface can cause serious accidents and injuries to users and others nearby as well as to the vehicle itself. Additionally, if a vehicle hits a bump in the road, the back end of the vehicle can fly up off the road, increasing the likelihood of sliding and potentially causing stress on other vehicle components.

Ideally, a removable weighted vehicle safety guard should provide a detachable safety guard system that securely increases the weight of the back end of the vehicle, yet would operate reliably and be manufactured at a modest expense. Thus, a need exists for a reliable removable weighted vehicle safety guard system to avoid the above-mentioned problems.

BRIEF SUMMARY OF THE INVENTION

In view of the foregoing disadvantages inherent in the known vehicle accessory art, the present invention provides a novel removable weighted vehicle safety guard system. The general purpose of the present invention, which will be described subsequently in greater detail, is to provide a safety attachment that removably attaches to the back end of a vehicle to add weight, thereby helping to keep the back end of the vehicle stabilized while driving in inclement weather or on slippery road surfaces. The removable weighted vehicle safety guard system also provides a brush guard to prevent damage to the vehicle should another vehicle rear-end the user's vehicle. Further, the removable weighted vehicle safety guard system saves tread wear and tear on tires as well.

The removable weighted vehicle safety guard system attaches to the back end of the vehicle via the hitch, and is secured using bolts or trailer pins. The removable weighted vehicle safety guard system provides static weight to weight the back end of the vehicle but may optionally also receive additional weight so more weight can be added depending on the environment. The additional weight may take a number of forms, including weight blocks, and can be added to the removable weighted vehicle safety guard system via bolts or trailer pins.

The present invention holds significant improvements and serves as a removable weighted vehicle safety guard system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention that are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures that accompany the written portion of this specification illustrate embodiments and method(s) of use for the present invention, a removable weighted vehicle safety guard system, constructed and operative according to the teachings of the present invention.

FIG. 3B is a perspective view illustrating a removable weighted vehicle safety guard system just after removably attaching to a vehicle, according to an embodiment of the presently claimed invention.

FIG. 4A is a perspective view illustrating a removable weighted vehicle safety guard system, according to an embodiment of the presently claimed invention.

FIG. 4B is a perspective view illustrating a removable weighted vehicle safety guard system with space for additional weights, according to an embodiment of the presently claimed invention.

FIG. 5 is a perspective view illustrating a removable weighted vehicle safety guard system with additional weights attached, to an embodiment of the presently claimed invention.

The various embodiments of the present invention will hereinafter be described in conjunction with the appended drawings, wherein like designations denote like elements

DETAILED DESCRIPTION

As discussed above, embodiments of the present invention relate to a removable weighted vehicle safety guard system and more particularly to a removable weighted vehicle safety guard system as used to improve the the safety and tire traction of a vehicle by weighting down the back end. Further, the removable weighted vehicle safety guard system may save tread wear and tear on tires as well.

Figure 1A:
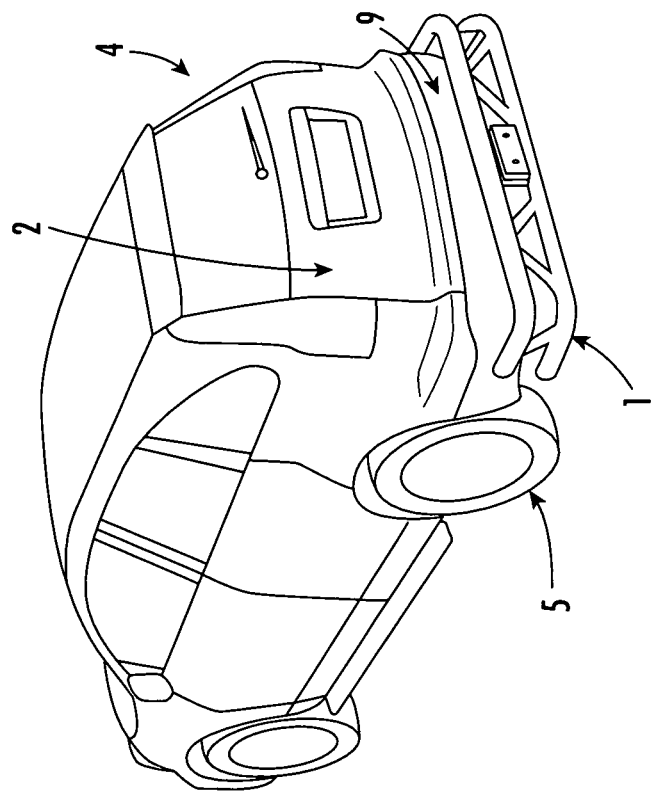
FIG. 1A shows a perspective view illustrating a removable weighted vehicle safety guard system on a pick-up truck, according to an embodiment of the presently claimed invention.
Figure 1B:
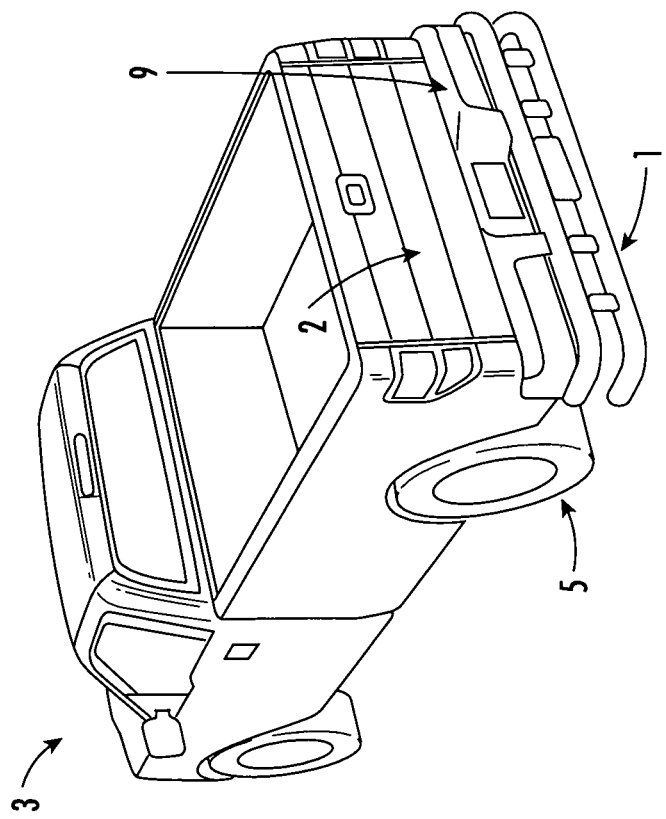
FIG. 1B shows a perspective view illustrating a removable weighted vehicle safety guard system on a car, according to an embodiment of the presently claimed invention.

Referring to the drawings by numerals of reference, there is shown in FIG. 1A, a removable weighted vehicle safety guard 1 attached to a back end 2 of a pick up truck 3. As shown in FIG. 1B, the removable weighted vehicle safety guard 1 is also attachable to the back end 2 of a car 4. Once attached, the removable weighted vehicle safety guard 1 adds static weight to the back end 2 of the car 4 or pick up truck 3, helping to keep the back tires 5 on the road, thereby preventing hyrdoplaning, slipping, or spinning out. The removable weighted vehicle safety guard 1 also serves as a brush guard to prevent damage to the vehicle 3, 4 by providing space around the back end 2 of the vehicle 3, 4 where the removable weighted vehicle safety guard 1 can crumple from the force of impact without harming the vehicle 3, 4, or simply prevent the vehicle bumper's 9 paint from being scratched.

Figure 2:
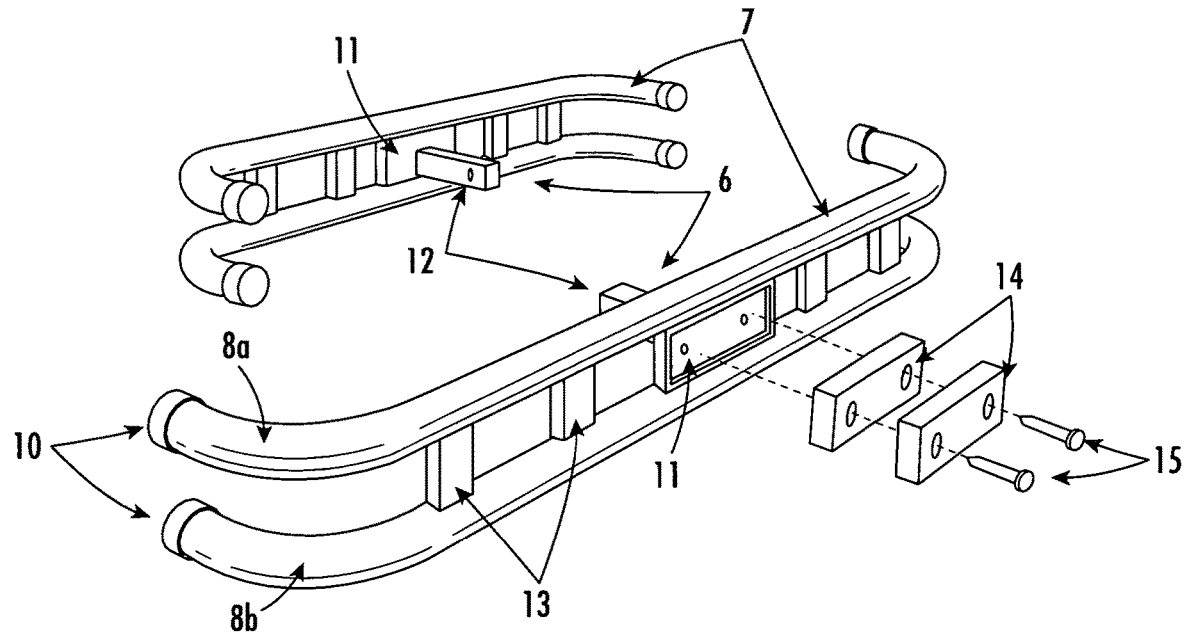
FIG. 2 is two perspective views illustrating a removable weighted vehicle safety guard system with additional weights, according to an embodiment of the presently claimed invention.

Referring now to FIG. 2, a removable weighted vehicle safety guard 1 has a center attachment part 6, having a flat plate 11 perpendicular to a tube 12, that connects the vehicle 3, 4 to the guard part 7. The guard part 7 has two bars 8a, 8b that run parallel to the vehicle's 3, 4, bumper 9. The bars 8a, 8b have an end cap 10 at each end. The bars 8a, 8b preferably have curved ends and a straight middle portion. When two bars 8a, 8b are present, the two bars 8a, 8b are connected by the flat plate 11 of the center attachment part 6 and one ore more connector pieces 13 that form slats between the two bars 8a, 8b.

One embodiment of the removable weighted vehicle safety guard 1 has additional weights 14 that are attachable to the flat plate 11 of the center attachment part 6. The additional weights 14 are secured to the flat plate 11 via one or more attachment devices 15 such as bolts or trailer pins.

Figure 3A:
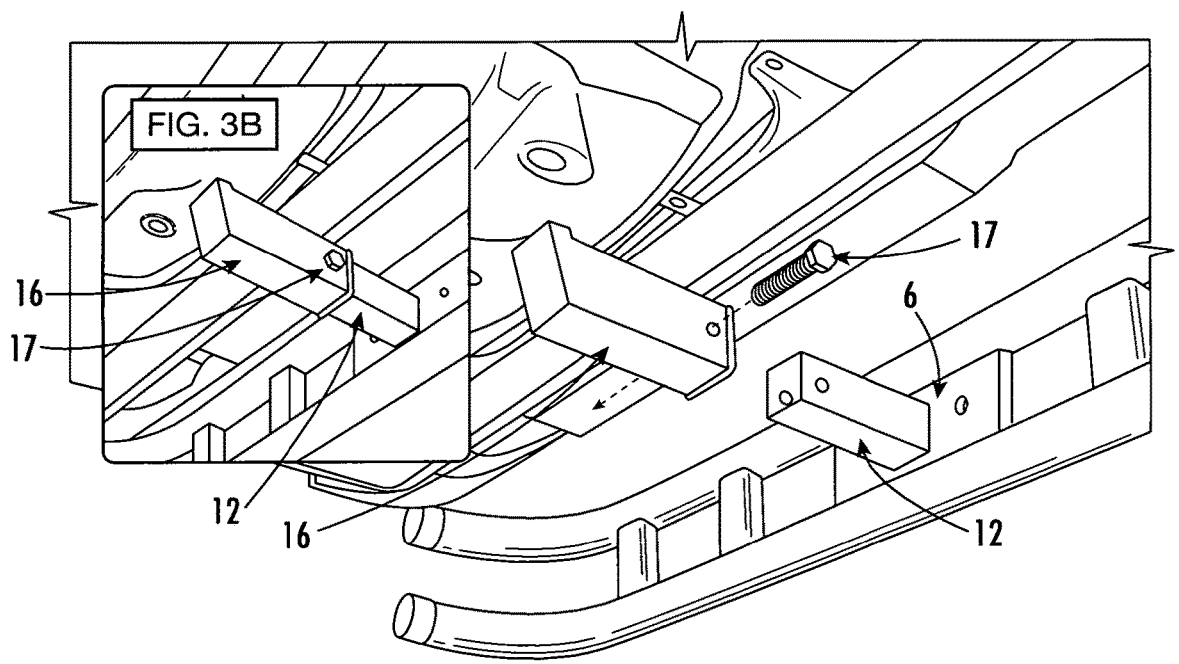
FIG. 3A is a perspective view illustrating a removable weighted vehicle safety guard system just prior to removably attaching to a vehicle, according to an embodiment of the presently claimed invention.

Referring now to FIG. 3, the removable weighted vehicle safety guard 1 is removably attached to a vehicle 3, 4 by sliding the tube 12 of the center attachment part 6 into a hitch 16 that is secured to the underside of the vehicle 3, 4 below the vehicle's bumper 9. The tube 12 is held in place by an attachment device 17 such as a bolt or trailer pin.

Referring now to FIGS. 4A-4B, there are multiple ways of connecting the two bars 8a, 8b to each other, including the flat plate 11 of the center attachment part 6 and one or more vertical slats 13. Alternately, in an embodiment without a space for the additional weights 14 to attach, the flat plate 11 of the center attachment part 6b may be shaped more like a thinner flat bar 17 while still providing a flat plate for the tube 12 to attach to, and the two bars 8a, 8b may be connected by slanted slats 18.

Referring now to FIG. 5, the additional weights 14 are attached to the removable weighted vehicle safety guard 1 via bolts 15, providing additional weight beyond the static weight supplied by the removable weighted vehicle safety guard 1. As the additional weight 14 is below the vehicle's bumper 9, this helps the vehicle's 4 tires to maintain traction on even slippery road surfaces. Additionally the flat plate 11 is shown combined with the slanted slats 18.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A removable weighted vehicle safety guard system comprising:
   (a) a first bar with a right end and a left end;
   (b) a second bar with a right end and a left end;
   (c) a center connection part having
      (i) a flat plate; and
      (ii) a hitch connection tube,
      wherein the hitch connection tube is operably connected perpendicular to the flat plate, wherein the hitch connection tube is removably attachable to a standard vehicle hitch via an attachment device; and
   wherein the first bar and the second bar are operably connected to the center connection part so that the first bar is parallel to the second bar;
   (d) four end caps, wherein one end cap is operably connected to the right end and the left end of the first bar and the second bar;
   (e) one or more connecting slats, wherein the first bar is further operably connected to the second bar via the one or more slats;
   (f) one or more selectively attachable weights, wherein the one or more selectively attachable weights are operably connectable to the flat plate of the vehicle centered connection part via one or more weight attachment devices for centering the one or more selectively attachable weights at a centerline of the vehicle; and
   wherein the first bar and the second bar extending outward and below the vehicle's bumper to operate as a brush guard by providing a crumpleable barrier around a back end of the vehicle to protect the vehicle while being able to crumple from a force of impact to not interfere with the vehicle's safety mechanisms.

2. The removable weighted vehicle safety guard system according to claim 1, wherein the first bar is curved at the right end and the left end and the second bar is curved at the right end and the left end, forming a wide u-shape to protect a left side and a right side as well as a front edge of a vehicle's bumper.

3. The removable weighted vehicle safety guard system according to claim 1, wherein the attachment device of the hitch connection tube is a bolt or trailer pin.

4. The removable weighted vehicle safety guard system according to claim 1, wherein the one or more weight attachment devices are bolts or trailer pins.

5. The removable weighted vehicle safety guard system according to claim 1, wherein the one or more connecting slats are perpendicular to the first bar and the second bar.

6. The removable weighted vehicle safety guard system according to claim 1, wherein the one or more connecting slats are diagonal to the first bar and the second bar.

7. A removable weighted vehicle safety guard system comprising:
- (a) a first bar with a right end and a left end;
- (b) a second bar with a right end and a left end, wherein the first bar is curved at the right end and the left end and the second bar is curved at the right end and the left end, forming a wide u-shape to protect a left side and a right side as well as a front edge of a vehicle's bumper;
- (c) a center connection part having
  - (i) a flat plate; and
  - (ii) a hitch connection tube,
  wherein the hitch connection tube is operably connected perpendicular to the flat plate, wherein the hitch connection tube is removably attachable to a standard vehicle hitch via a bolt or a trailer pin; and wherein the first bar and the second bar are operably connected to the center connection part so that the first bar is parallel to the second bar;
- (d) four end caps, wherein one end cap is operably connected to the right end and the left end of the first bar and the second bar;
- (e) one or more connecting slats, wherein the first bar is further operably connected to the second bar via the one or more slats;
- (f) one or more selectively attachable weights, wherein the one or more selectively attachable weights are operably connectable to the flat plate of the centered connection part via one or more bolts or one or more trailer pins for centering the one or more selectively attachable weights at a centerline of the vehicle; and wherein the first bar and the second bar extending outward and below the vehicle's bumper to operate as a brush guard by providing a crumpleable barrier around a back end of the vehicle to protect the vehicle while being able to crumple from a force of impact to not interfere with the vehicle's safety mechanisms.

8. The removable weighted vehicle safety guard system according to claim 7, wherein the one or more connecting slats are perpendicular to the first bar and the second bar.

9. The removable weighted vehicle safety guard system according to claim 7, wherein the one or more connecting slats are diagonal to the first bar and the second bar.

* * * * *